US011356255B1

(12) United States Patent
Emelyanov et al.

(10) Patent No.: US 11,356,255 B1
(45) Date of Patent: Jun. 7, 2022

(54) SYSTEM AND METHOD FOR SECURELY CONNECTING APPLICATIONS TO MIDDLEWARE SERVICES IN A CLOUD PLATFORM

(71) Applicant: Virtuozzo International GmbH, Schaffhausen (CH)

(72) Inventors: Pavel Emelyanov, Moscow (RU); Alexey Kobets, Seattle, WA (US)

(73) Assignee: Virtuozzo International GmbH, Schaffhausen (CH)

( * ) Notice: Subject to any disclaimer, the term of this patent is extended or adjusted under 35 U.S.C. 154(b) by 117 days.

(21) Appl. No.: 16/731,568

(22) Filed: Dec. 31, 2019

(51) Int. Cl.
*H04L 9/08* (2006.01)
*H04L 9/40* (2022.01)
*H04L 9/32* (2006.01)

(52) U.S. Cl.
CPC .......... *H04L 9/0894* (2013.01); *H04L 9/3226* (2013.01); *H04L 63/083* (2013.01)

(58) Field of Classification Search
CPC .... H04L 9/0894; H04L 9/3226; H04L 63/083
See application file for complete search history.

(56) References Cited

U.S. PATENT DOCUMENTS

| | | | | |
|---|---|---|---|---|
| 2003/0191935 A1* | 10/2003 | Ferguson | .............. | H04W 12/06 713/153 |
| 2016/0352665 A1* | 12/2016 | Nielsen | ............. | H04L 29/08099 |
| 2017/0013015 A1* | 1/2017 | Dinha | ........................ | G06F 9/54 |
| 2018/0159856 A1* | 6/2018 | Gujarathi | ................ | H04L 67/10 |
| 2020/0145385 A1* | 5/2020 | Chauhan | ................ | H04L 67/02 |
| 2020/0287894 A1* | 9/2020 | Leon | .................... | H04L 63/0807 |

* cited by examiner

*Primary Examiner* — Henry Tsang
(74) *Attorney, Agent, or Firm* — ArentFox Schiff LLP; Michael Fainberg

(57) ABSTRACT

Disclosed herein are systems and methods for secure authentication of a managed application. In one aspect, an exemplary method comprises receiving, by a cloud platform, a request from a managed application to connect to a middleware service, determining that the managed application is authenticated to use the middleware service based on the secret, obtaining a secret associated with the managed application and the middleware service from a secret store, connecting to the middleware service using the secret to establish a secure connection, and delegating, to the managed application, the secure connection between the managed application and the middleware service.

20 Claims, 5 Drawing Sheets

US 11,356,255 B1

SYSTEM AND METHOD FOR SECURELY CONNECTING APPLICATIONS TO MIDDLEWARE SERVICES IN A CLOUD PLATFORM

FIELD OF TECHNOLOGY

The present disclosure relates generally to the field of application security in cloud platforms, more specifically, to systems and methods for securely connecting applications to middleware services in a cloud platform.

BACKGROUND

Clients can deploy software applications in a cloud computing platform in order to take advantage of the distributed resources provided by the platform. Inside most platforms there are one or more instances of middleware services. Middleware services are additional services that are launched in the platform and that applications may want to use. Examples of middleware services include databases, message-queueing services, crypto key stores, and the like. When developing the application, a client writes code that connects to and authenticates with the middleware service using a "secret" (e.g., password), as seen in FIG. 1, for example.

However, a problem may arise. The computing platform gives the application code access to the secret while protecting the secret from being leaked or disclosed to untrusted parties and places. However, providing the secret to the application code likely increases the risk of the secret being compromised.

Presently, solutions to this problem include allowing a client to generate the secret themselves. According to this solution, the burden of keeping the secret secure rests with the client. Then the secret is to be transferred into the cloud platform using some protected mechanism for safety. However, putting the burden on the client is also undesirable as it may lead to a compromised secret.

In one exemplary scenario, the client may create a secret (e.g., a password), and store the password in a configuration file associated with an application being developed. The client then authenticates itself in the cloud computing platform and uploads the configuration file. The application code may resemble the following pseudocode:

cfg=open_config_file( )
secret=cfg.read_secret_for("middleware_id")

I.e., the application opens the configuration file and reads from it a secret (e.g., password) corresponding to a needed middleware (e.g., database, etc.).

In other words, there is no secret stored in the application code. Instead the application reads the secret during run-time as the application is executing on the cloud computing platform. Then, a connection to the middleware can be established by the application (for example by using the following pseudocode connection=connect_to("middleware_id", secret)). However, even in this instance, the secret is available outside of the computing platform and thus can be obtained and the middleware services may be used without authorization.

Therefore, there is a need in the art for securely connecting applications and middleware services in a cloud platform.

SUMMARY

A system and method is disclosed herein for secure authentication of a managed application. According to one aspect, a method is provided, comprising receiving, by a cloud platform, a request from a managed application to connect to a middleware service, determining that the managed application is authenticated to use the middleware service based on the secret, obtaining a secret associated with the managed application and the middleware service from a secret store, connecting to the middleware service using the secret to establish a secure connection, and delegating, to the managed application, the secure connection between the managed application and the middleware service;

Yet some other aspects of the disclosure provide for a computer-readable medium storing thereon instructions for secure authentication of a managed application the instructions including instructions for receiving, by a cloud platform, a request from a managed application to connect to a middleware service, determining that the managed application is authenticated to use the middleware service based on the secret, obtaining a secret associated with the managed application and the middleware service from a secret store, connecting to the middleware service using the secret to establish a secure connection, and delegating, to the managed application, the secure connection between the managed application and the middleware service;

In another aspect, various systems described herein including a processor for secure authentication of a managed application, the processor configured to: receive, by a cloud platform, a request from a managed application to connect to a middleware service, determine that the managed application is authenticated to use the middleware service based on the secret, obtain a secret associated with the managed application and the middleware service from a secret store, connect to the middleware service using the secret to establish a secure connection, and delegate, to the managed application, the secure connection between the managed application and the middleware service.

In one aspect, In one aspect, the method further comprises: prior to receiving the connection request, providing the managed application with an identifier for the middleware service.

In one aspect, the method further comprises: after providing the identifier, receiving an upload of the managed application, generating the secret associated with the managed application and the middleware service, and storing the secret in the secret store.

In one aspect, the secret is generated based on the managed applications directive to use the middleware service.

In one aspect, the method further comprises: connecting to the middleware service upon execution of middleware connection call in the managed application.

In one aspect, the receiving, connecting and determining are performed in a first process, and the obtaining of the secret and delegating the secure connection are performed using a second process.

In one aspect, the method further comprises: obtaining a collection handler for handling the secure connection from the second process, and passing the connection handler to the first process.

In one aspect, passing the connection handler is performed by using a file handler passing mechanism of an underlying operating system (OS) executing on the hardware processor.

In one aspect, the method further comprises: performing obtaining the secret and determining whether the managed application is authenticated in kernel address space of an operating system (OS) executing on the hardware processor, wherein the kernel address space is protected from user address space at a hardware level by the OS.

In one aspect, the secret store is one of a key value store or a key management service.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for securely connecting applications to middleware services in a cloud platform. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
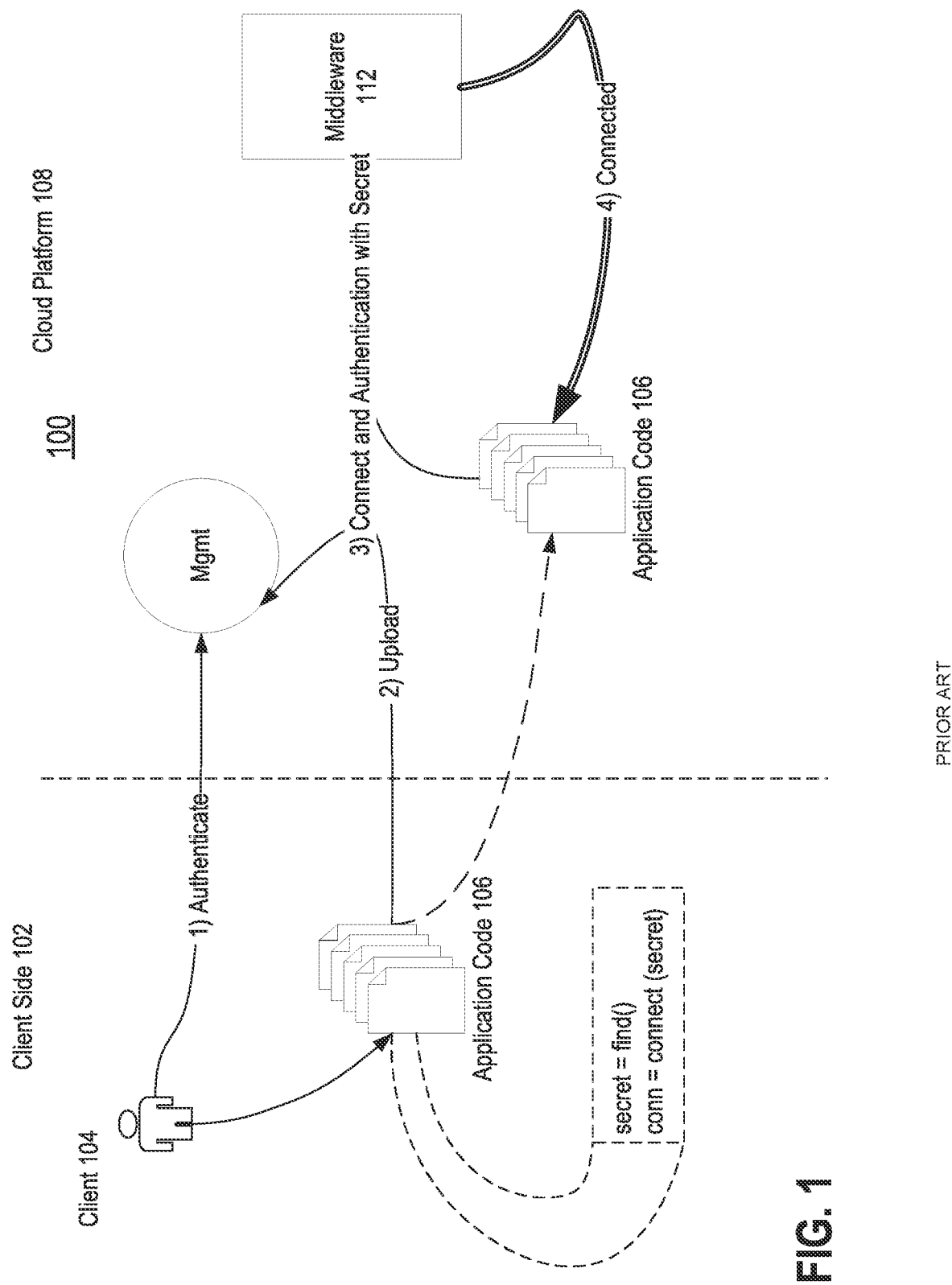
FIG. 1 illustrates a block diagram of system found in prior art for connection in cloud platforms.
Figure 2:
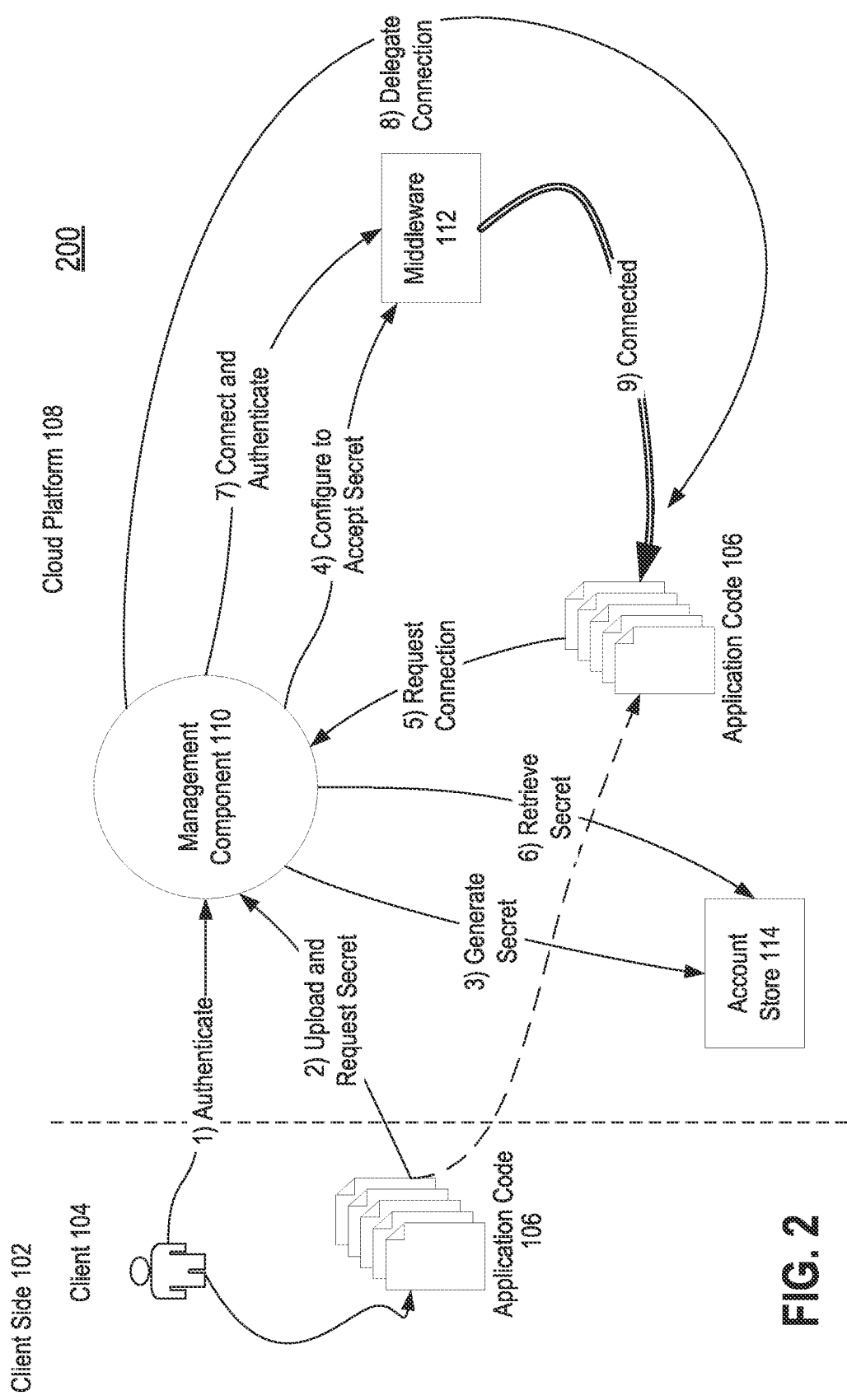
FIG. 2 illustrates a block diagram of a system for securely connecting applications and middleware services in a cloud platform, in accordance with exemplary aspects of the present disclosure.

FIG. 2 illustrates a block diagram of a system 200 for securely, connecting applications to middleware services, in accordance with exemplary aspects of the present disclosure.

The system 200 comprises a cloud platform 108 connected to client side 102. The client side 102 may include a client 104 that generates application code 106 and can connect to the cloud platform and upload the code. The application code 106 is loaded on the cloud platform 108, can be executed and during execution accesses the various services (e.g., middleware services) provided by the cloud platform 108. In one aspect, it takes advantage of other managed application benefits. The cloud platform 108 comprises a management component 110, middleware services, collectively middleware 112 and an account store 114 (also called secret store, where the information needed for authentication of applications to the middleware services is stored in some aspects). Examples of middleware may be database, message-queueing service, crypto key store, etc. In exemplary aspects, the management component 110 perform authentication of the client 104, allowing the client 104 to perform an upload of the application code 106.

The management component 110 additionally handles requests from deployed application code 106 for connection and/or authentication to middleware 112. The application code 106, however, does not directly contain any authentication information for the middleware 112. In some aspects, the management component 110 generates "secrets" for connecting applications to middleware services 112 and provides such a connection upon application request. In exemplary aspects, a secret is a security token used to access a particular service and the secret may take the form of a textual passcode, a binary token, or the like. Examples of secrets may also be passwords or private keys, etc.

Additionally, in some aspects, the management component 110 generates secrets for the application and middleware pairs, stores the secrets in account store 114, retrieves the secrets upon application request and connects the application code 106 to the middleware 112 based on a retrieved secret from the account store 114. In some aspects, the management component 110 provides authentication of the application code 106 to the middleware 112 without revealing the secret (corresponding for the middleware 112 and the application code) to the application code 106. The management component 110 never passes the secret to the application code 106, which consequently does not store the secret in any of its variables or data structures.

An exemplary sequence of events is illustrated in FIG. 2. At (1), the client 104 authenticates itself with the management component 110. In exemplary aspects, this may be performed using any method of authentication made available by the cloud platform 108. At (2), the client 104 uploads the application code 106 and requests that the management component 110 generate a secret for this particular application's access to one or more middleware services. In exemplary aspects, the cloud platform 108 provides a plurality of middleware service (and supports identifying middleware services by identifier). When a client uploads its application to the cloud it needs to specify a middleware service identifier of the middleware service to which the uploading code needs to connect (in some aspects, the user obtains the request ID from the platform upon request). So, if the client 104 wants to use any of the services, it may provide a plurality of identifiers that identify each middleware service that the application code 106 may invoke. The application code 106 does not directly store any authentication information for middleware 112. In some aspects, The cloud platform 108 provides a library for connecting and authenticating to the middleware 112. (In some of these aspects, the library may be a part of the management component 110 and/or may be an interface for calling the management component 110.) The application code 106 imports the library according to the standard methods provided by the programming language of the code 106. The code 106 may then call the middleware 112 using the library. For example, the code may appear as follows:

connection=connect_to("middleware_id")

For example, in some aspects, when the application needs to connect to the specific middleware service, the application invokes a function provided by the library and indicates the middleware service identifier of the specific middleware service (e.g., as an argument of the function).

As shown above, the secret is not provided as an argument. In some aspects, the exemplary "connect_to" method may comprise (depending on library implementation) further calls that request that the cloud platform retrieve the secret associated with the specified "middleware_id" key. Further, the "connect_to" may then connect to the middleware 112 and authenticate using the middleware specific method or protocol and return the connection handler back to the application during run-time.

At (3) the management component 110 generates a secret for each middleware identifier (e.g., specified by the client or needed by the application) and stores the middleware identifier(s) and secret(s) as a pair in the account store 114. The account store 114 may be a data store, e.g., a protected database, or may take the form of other data structures such as a Key Management Service (KMS) or other secure key/value store, though the present disclosure is not limited thereto. In some aspects the account store 114 is a protected, so that no application could access it.

Subsequently, at (4) the middleware 112 is configured (e.g., by management component, or library) to accept the generated secret(s). For example, if multiple middleware services identifiers were provided during the upload at (2), the management component 110 may configure these middleware services to accept each corresponding secret. In some aspects, the configuration is so that, if a future authentication request with the secret (the accepted one) comes to the middleware service the service will accept the connection. In some aspects, the different middleware services may have different ways of authentication, and so have to configured differently. Once the application code 106 is uploaded and deployed, it may be invoked to perform the functions specified by the client 104. As the application code 106 executes, the application may request a connection to a middleware service at (5). E.g., the application asks the management component 110 to provide (or help in establishing) a connection between the application and a middleware service. This can be done, for example, using the library (e.g., by calling "connect_to" function, the "connect_to" function only provided as an example, not limiting the present disclosure).

As described above, once the application requests the connection, the management component 110 at (6) retrieves the secret from account store, e.g., using the middleware identifier of the requested middleware service as a key. At (7) the management component 110 connects and authenticates to the requested middleware service. At (8), the management component 110 delegates the connection to the application.

In some aspects, retrieving the secret from store implies that the secret is stored in memory, even temporarily, where the application code 106 may access the secret. In order to prevent this, in some aspects, the retrieving the secret and authenticating can be done outside of the application process address space. In one aspect, the code that reads the secret and passes the secret on for authentication can be a separate process (i.e., not the process belonging to the application). Therefore, at (8), the management component 110 may securely delegate the connection handler back to the application. In the aspects, the connection handler is passed back to the application process (e.g., the process executing the application code 106) using an Operating System level file handler passing mechanism, though other methods are also contemplated. In an alternative aspect, the read secret and authentication code resides in the OS kernel address space at a hardware level, protected from user-space where the application code 106 is executed.

In some aspects, inside the exemplary "connect_to( )" call the library requests the cloud platform to retrieve the secret from the secret store by the middleware identifier key, to connect and to authenticate using the middleware-specific method or protocol and then return the connection handler back to the application.

At (9), the deployed application is now connected to the middleware 112 without exposure of the secret to the application.

So, the method implies randomly generating secrets (as the management components generates them), authenticating outside of the client process address space (to prevent the application accessing the secret) and securely passing the established communication channel to the client.

Figure 3:
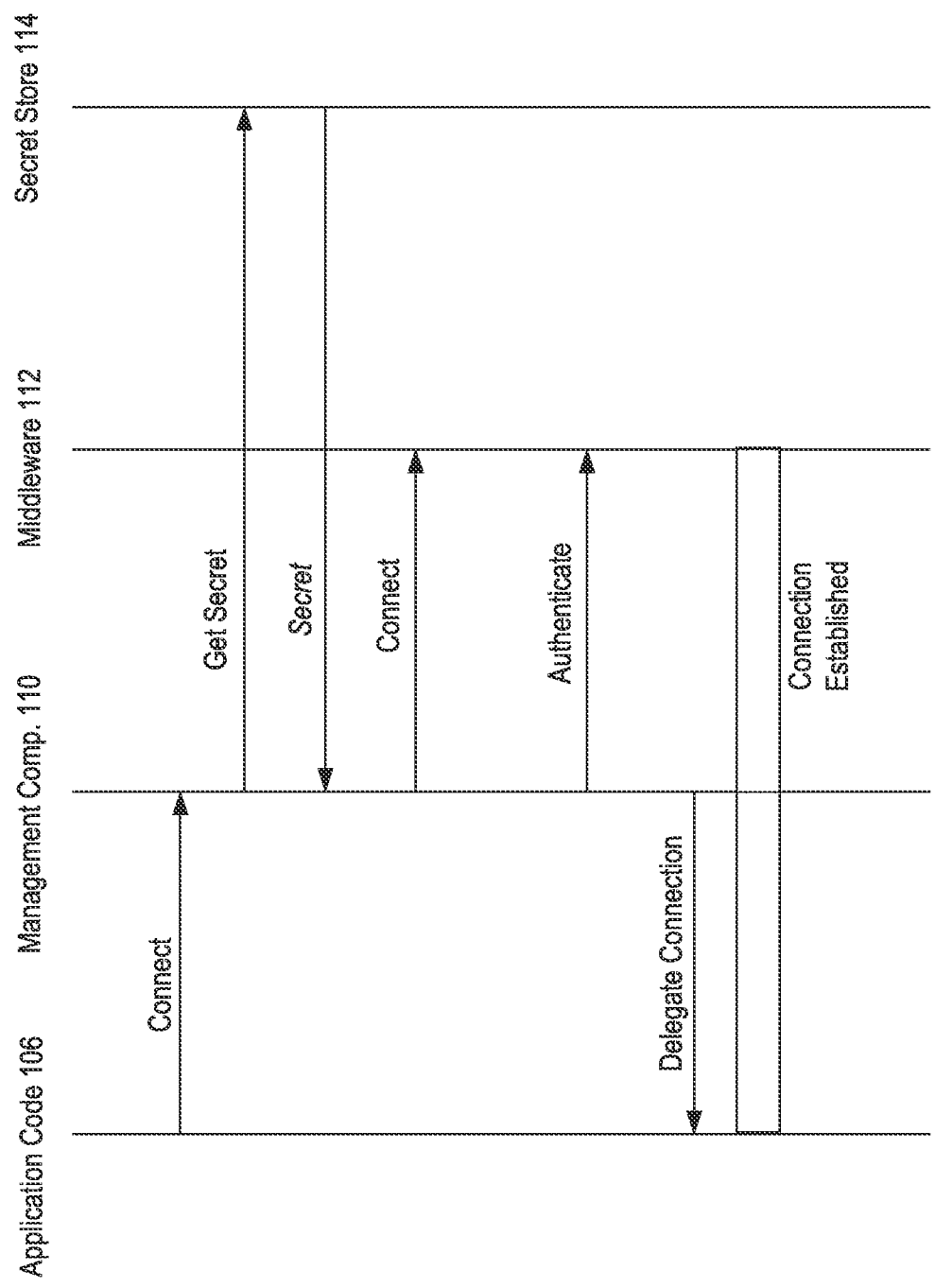
FIG. 3 is a sequence diagram for a method for securely connecting applications and middleware services in a cloud platform, in accordance with exemplary aspects of the present disclosure.

FIG. 3 is a sequence diagram 300 for a method for securely connection between an application and middleware in a cloud platform in accordance with exemplary aspects of the present disclosure.

In order to clarify the relationships between the various components of the system 200, the sequence diagram 300 illustrates the order and organization of the steps of the method.

Figure 4:
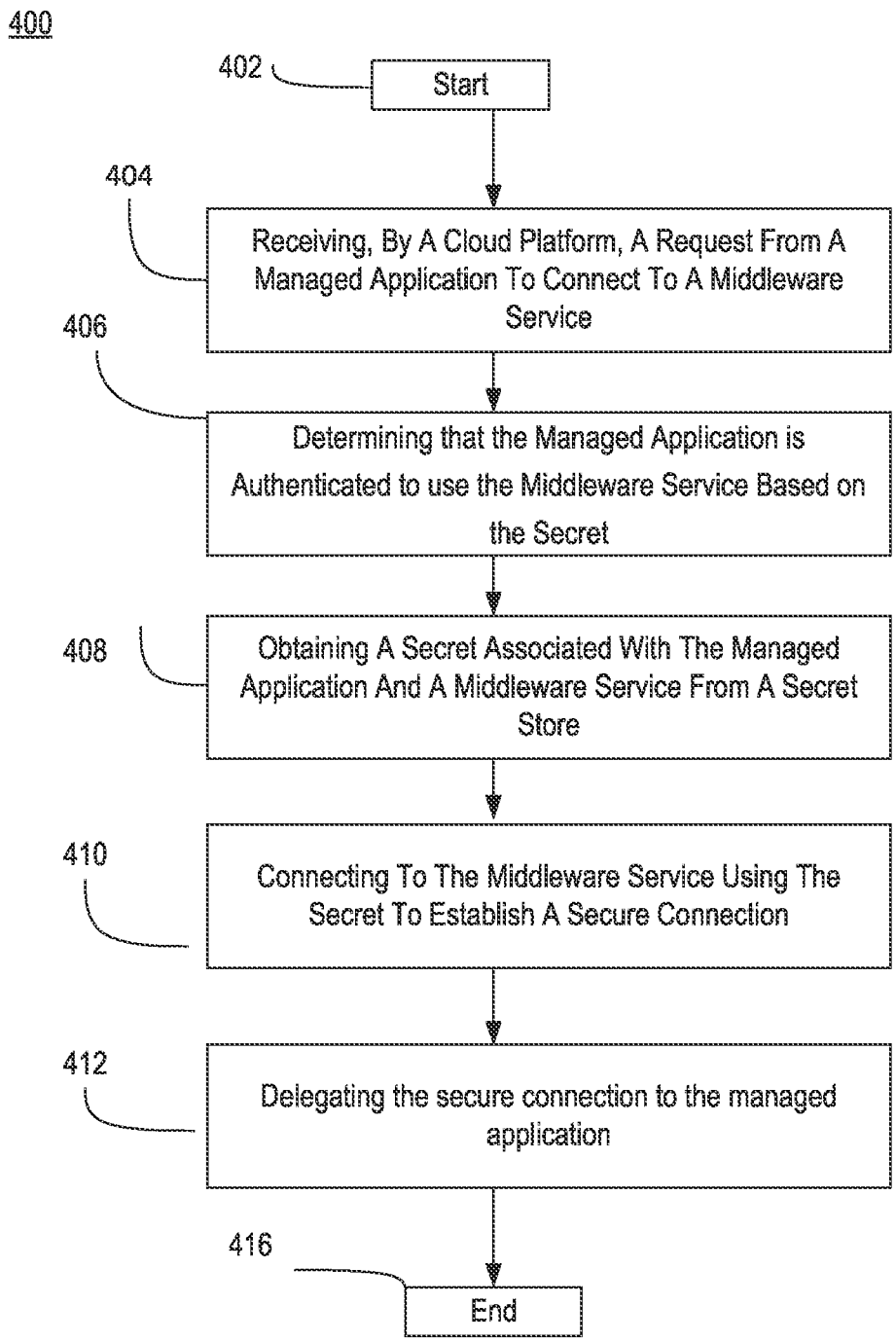
FIG. 4 is a flow diagram for a method for securely connecting applications and middleware services in a cloud platform, in accordance with exemplary aspects of the present disclosure.

As the application code 106 executes on the cloud platform 108, the application code 106 connects to the management component 110. Subsequently, the Management component 110 retrieves the secret from the secret account store 114. The secret is returned to the management component 110 and the management component connects to the middleware 112. The management component 110 then authenticates with the middleware 112 using the retrieved secret from the secret account store 114. The connection established between the management component 110 and the middleware 112 is then delegated, by the management component 110, to the executing application code 106. Accordingly, a connection is established between the executing application code 106 and the middleware 112. FIG. 4 is a flow diagram for a method 400 for, in accordance with exemplary aspects of the present disclosure.

The method begins at 402 and proceeds to 404.

At 404, the cloud platform (e.g., the management component 110) receives a request from a managed application to connect to a middleware service hosted by the cloud platform.

At 406, the cloud platform determining whether the managed application is authenticated to use the middleware service based on the secret. Otherwise, the managed application cannot use the middleware service.

At 48, the cloud platform obtains a secret associated with the managed application and the middleware service from a secret store. In exemplary aspects, the secret store is an account store that allows the storage and retrieval of credentials, such as secrets, associated with middleware services hosted by the platform, along with secrets for services hosted elsewhere.

At 410, the cloud platform connects to the middleware service using the secret to establish a secure connection between the cloud platform and the middleware service.

At 412, the cloud platform delegates, to the managed application, the secure connection. The method ends in step 416.

In exemplary aspects, the secure connection is between the managed application and the middleware service.

Subsequently, the managed application can make calls to the middleware service, while being unaware of the credentials, or secret, used to access the middleware service. This eliminates the need to store credentialing and authorizing information in application code, and instead moves the burden of managing secrets to the cloud platform, e.g., cloud platform 108.

Figure 5:
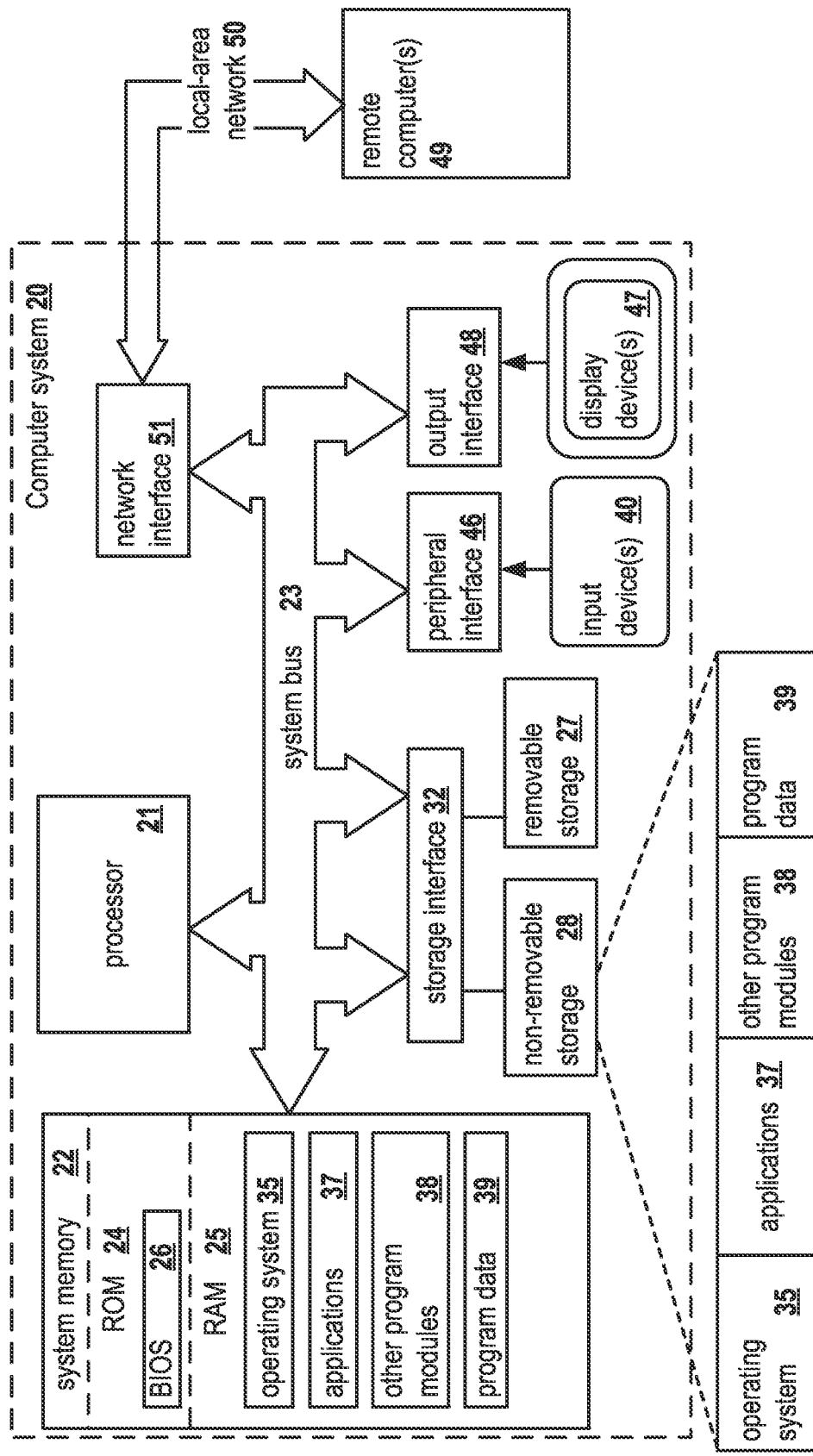
FIG. 5 illustrates a block diagram of a general-purpose computer system on which the disclosed system and method can be implemented according to an exemplary aspect.

FIG. 5 is a block diagram illustrating a computer system 20 on which aspects of systems and methods of connecting managed applications and middleware services may be implemented in accordance with an exemplary aspect. It should be noted that the computer system 20 can correspond to any components of the system 200 described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computer system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for secure authentication of a managed application, comprising:
   providing, by a cloud platform, the managed application with an identifier for a middleware service;
   after providing the identifier, receiving, by the cloud platform, an upload of the managed application;
   generating, by the cloud platform, a secret associated with the managed application and the middleware service;
   storing the secret in a secret store;
   after receiving the upload, receiving, by the cloud platform, a request from the managed application to connect_to the middleware service;
   determining that the managed application is authenticated to use the middleware service based on the secret;
   obtaining the secret associated with the managed application and the middleware service from the secret store;
   connecting to the middleware service using the secret to establish a secure connection; and
   delegating, to the managed application, the secure connection between the managed application and the middleware service.

2. The method of claim 1, wherein the secret is generated based on the managed applications directive to use the middleware service.

3. The method of claim 1, further comprising:
   connecting to the middleware service upon execution of middleware connection call in the managed application.

4. The method of claim 1, wherein the receiving, connecting and determining are performed in a first process, and the obtaining of the secret and delegating the secure connection are performed using a second process.

5. The method of claim 4, further comprising:
   obtaining a connection handler for handling the secure connection from the second process; and
   passing the connection handler to the first process.

6. The method of claim 5, wherein passing the connection handler is performed by using a file handler passing mechanism of an underlying operating system (OS) executing on a hardware processor.

7. The method of claim 5, further comprising:
   performing obtaining the secret and determining whether the managed application is authenticated in kernel address space of an operating system (OS) executing on the hardware processor, wherein the kernel address space is protected from user address space at a hardware level by the OS.

8. The method of claim 1, wherein the secret store is one of a key value store or a key management service.

9. A system for secure authentication of a managed application, the system comprising:
- a memory; and
- at least one processor configured to:
  - provide the managed application with an identifier for a middleware service;
  - after providing the identifier, receive an upload of the managed application;
  - generate a secret associated with the managed application and the middleware service;
  - store the secret in a secret store;
  - after receiving the upload, receive, by the cloud platform, a request from the managed application to connect_to the middleware service;
  - determine that the managed application is authenticated to use the middleware service based on the secret;
  - obtain the secret associated with the managed application and the middleware service from the secret store;
  - connect_to the middleware service using the secret to establish a secure connection; and
  - delegate to the managed application, the secure connection between the managed application and the middleware service.

10. The system of claim 9, wherein the secret is generated based on the managed applications directive to use the middleware service.

11. The system of claim 9, the processor further configured to:
- connect_to the middleware service upon execution of middleware connection call in the managed application.

12. The system of claim 9, wherein the receiving, connecting and determining are performed in a first process, and the obtaining of the secret and delegating the secure connection are performed using a second process.

13. The system of claim 12, wherein the processor is further configured to:
- obtain a connection handler for handling the secure connection from the second process; and
- pass the connection handler to the first process.

14. The system of claim 13, wherein passing the connection handler is performed by using a file handler passing mechanism of an underlying operating system (OS) executing on a hardware processor.

15. A non-transitory computer readable medium storing thereon computer executable instructions for secure authentication of a managed application, the instructions including instructions for:
- providing, by a cloud platform, the managed application with an identifier for a middleware service;
- after providing the identifier, receiving, by the cloud platform, an upload of the managed application;
- generating, by the cloud platform, a secret associated with the managed application and the middleware service;
- storing the secret in a secret store;
- after receiving the upload, receiving, by the cloud platform, a request from the managed application to connect_to the middleware service;
- determining that the managed application is authenticated to use the middleware service based on the secret;
- obtaining the secret associated with the managed application and the middleware service from the secret store;
- connecting to the middleware service using the secret to establish a secure connection; and
- delegating, to the managed application, the secure connection between the managed application and the middleware service.

16. The non-transitory computer readable medium of claim 15, wherein the secret is generated based on the managed applications directive to use the middleware service.

17. The non-transitory computer readable medium of claim 16, the instructions further comprising instructions for:
- connecting to the middleware service upon execution of middleware connection call in the managed application.

18. The non-transitory computer readable medium of claim 15, wherein the receiving, connecting and determining are performed in a first process, and the obtaining of the secret and delegating the secure connection are performed using a second process.

19. The non-transitory computer readable medium of claim 18, wherein the instructions further include instructions for:
- obtaining a connection handler for handling the secure connection from the second process; and
- passing the connection handler to the first process.

20. The non-transitory computer readable medium of claim 19, wherein passing the connection handler is performed by using a file handler passing mechanism of an underlying operating system (OS) executing on a hardware processor.

* * * * *